March 17, 1970 — O. NORDBY — 3,501,165
CONVERTIBLE TRANSPORT VEHICLE
Filed Dec. 8, 1967 — 2 Sheets-Sheet 1
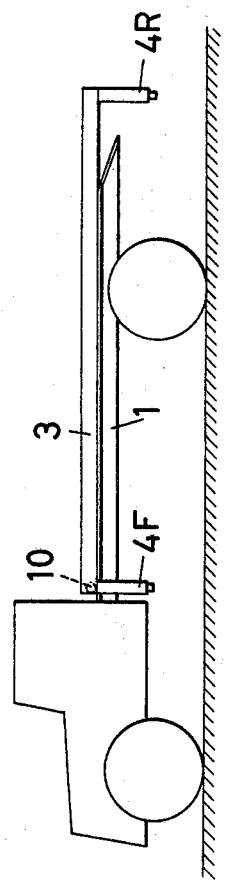
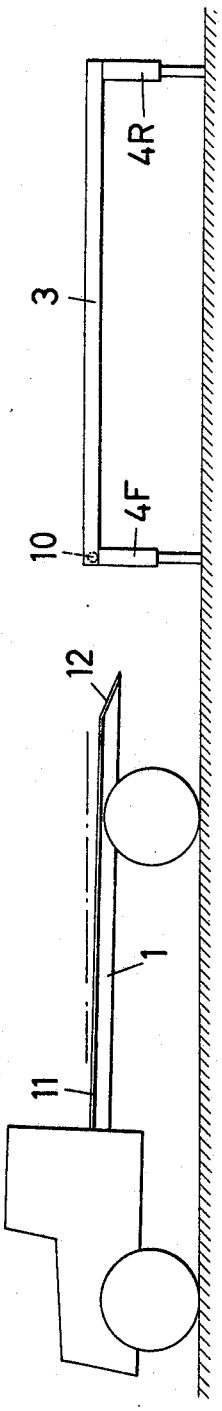
INVENTOR
Ola Nordby March 17, 1970   O. NORDBY   3,501,165
CONVERTIBLE TRANSPORT VEHICLE
Filed Dec. 8, 1967   2 Sheets-Sheet 2

INVENTOR
Ola Nordby
By Laurence R. Brown
Attorney

United States Patent Office 3,501,165
Patented Mar. 17, 1970

3,501,165
CONVERTIBLE TRANSPORT VEHICLE
Ola Nordby, Abbediengveien 19, Oslo 2, Norway
Filed Dec. 8, 1967, Ser. No. 689,058
Int. Cl. B62d 21/14, 33/08, 61/12
U.S. Cl. 280—43.23
2 Claims

ABSTRACT OF THE DISCLOSURE

A removable loading platform with support legs is detachably secured to the chassis frame of a vehicle by means of clamps locking the platform to the frame. A hydraulic mechanism compresses the springs of the vehicle to permit the platform to rest on the support legs and concurrently releases the clamps from locking position and to release the platform.

SUMMARY

The present invention relates to a convertible transport vehicle adapted for selectively transporting different kinds of goods, such as piece goods and tank cargo respectively, the loading area or the tank carrying the goods being rigidly connected to a frame which is detachably secured to the chassis frame of the vehicle and optionally being provided with adjustable legs, the chassis frame of the vehicle being adapted to be lowered and lifted relative to the rear wheel shaft of the vehicle. The chassis frame may be adapted for pivotal movement about an axis situated forward of and parallel to the rear wheel shaft. Further the chassis frame may be provided with guide rails adapted to guide wheels mounted at the forward end of the load frame, and said guide rails may at their rear ends be shaped in the form of fish tail like downwardly inclined gradients.

For transport users the importance of a more efficient utilization of their transport vehicles is appreciated more and more. To this end different types of detachable loading areas have been proposed, such loading areas being optionally provided with extendable legs.

The object of the present invention is to provide a transport vehicle which may be used selectively for the transport of various types of goods, so that for one trip it may be used for transporting piece goods on an ordinary loading area and for another trip for transporting goods in tanks, e.g. liquids. An important object of the invention is to provide a transport vehicle which may allow an expedient change from one type of loading facility to another.

This object is achieved by a transport vehicle of the kind specified in which the chassis may be lifted or lowered relative to the rear wheel axle. Such lifting or lowering of the chassis may conveniently consist in a pivoting of the chassis about an axis disposed forwardly of and parallel to said rear wheel axle.

To facilitate movement of the detachable frame, to which the loading area or the loading tank is fixedly secured, off and on to said chassis, the chassis may be provided with guide rails to be engaged by and guide rollers or the like mounted on the detachable frame at or near the forward end of such frame.

Figure 3:
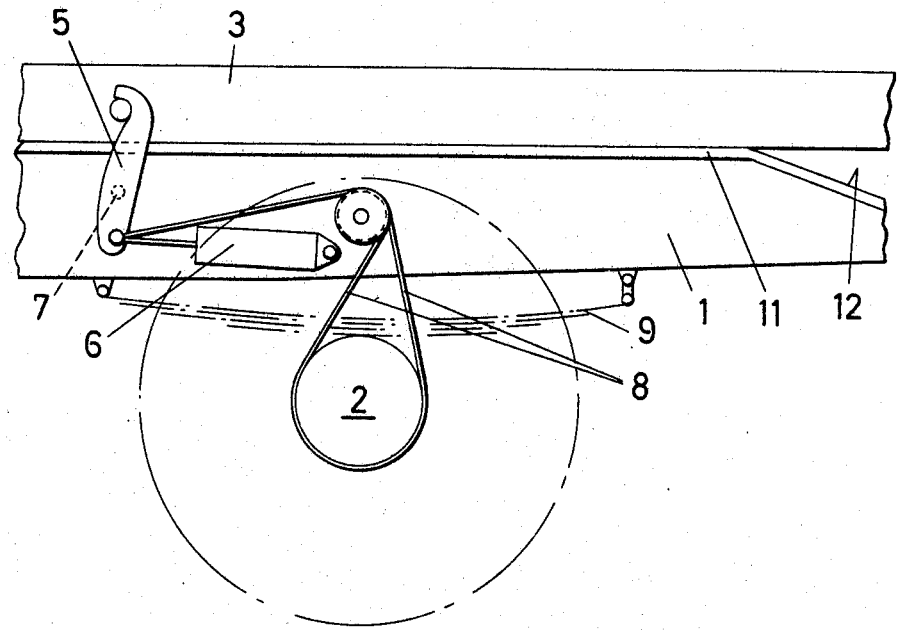
Figure 4:
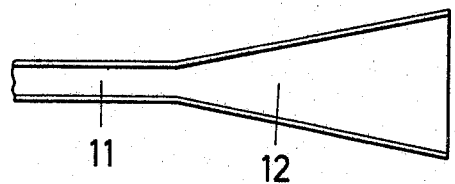

These and other features of the invention and its mode of operation will become apparent from the following description, reference being made to the accompanying drawings, in which FIG. 1 is a side view of the convertible vehicle of the invention carrying the detachable frame, FIG. 2 is a side view of the convertible vehicle with lowered chassis, the detachable frame being separated from the vehicle, FIG. 3 shows a detail including the means for locking the detachable frame and lifting or lowering the chassis, and FIG. 4 is a plan view of the rear end of the guide rail mounted on the chassis.

Referring to the drawings, the vehicle comprises a chassis 1 which by means of devices which will be described below may be lifted or lowered relative to rear wheel axle 2 of the vehicle.

The goods to be transported on the vehicle are disposed on or in a loading facility, such as a loading area or in a tank, such loading facility being rigidly secured to a detachable frame 3. The frame 3 is provided with telescopic legs 4F and 4R being adjustable to predetermined lengths. In order that the rear wheels of the vehicle may pass between the front legs 4F of the detachable frame 3 when supported by its four legs, the front legs 4F are adjustable not only in vertical direction but also in a transverse direction so that when the detachable frame is secured on the chassis and during driving such front legs do not project from the sides of the vehicle.

During driving the detachable frame 3 is secured to the chassis 1 i.a. by means of a pair of locking hooks 5 which under the influence of a hydraulic or pneumatic cylinder means 6 may pivot about an axis 7 parallel to the rear wheel axle 2. The locking hooks 5 are rigidly secured, e.g. by welding, to their pivot axes, and are through wires 8 connected to the rear wheel axle 2, the wires 8 e.g. forming loops about said axle. In locking position the hooks 5 engage a bar secured to the detachable frame 3. For unlocking of the detachable frame relative to the chassis, the hooks are pivoted in an anticlockwise direction as viewed in FIG. 3, such movement being caused by said cylinder means 6. During such unlocking movement of the hooks 5 they will also tighten the wires 8 so that the chassis 1 is lowered relative to the rear wheel axle 2 against the action of springs 9. On relieving the pressure in the cylinder means 6 the spring effect in springs 9 causes lifting of the chassis 1 and at the same time locking movement of hooks 5.

When the hooks 5 are pivoted to inactive position (unlocked position) and the chassis 1 lowered towards the rear wheel axle 2, the rear legs 4R of the detachable frame 3 rest on the ground. The front end of the frame 3 rests through a pair of wheels 10 on the upper side of the chassis or on guide rails 11 arranged on said chassis. On driving the vehicle forward the wheels 10 roll on the chassis 1 or the guide rails 11 respectively until rolling off the same. In order to smoothen the final separation of the frame 3 from the chassis 1, the rear ends of the guide rails 11 or the chassis may be provided with downwardly inclined outwardly diverging gradients 12. When the wheels 10 roll down the gradients 12 the front legs 4F of the frame 3 engage and rest on the ground and now the vehicle may be driven completely away while the frame is left standing on its legs.

The vehicle may now be driven to some other location to be connected with another frame which has been unloaded and possibly re-loaded, while unloading is effected on the frame which has just been left.

For connection of a frame 3 with the vehicle chassis 1, the vehicle is driven carefully backwards and with lowered chassis 1 so that the chassis enters below the frame 3 and between the front legs 4F thereof. Thus, the wheels 10 of the frame 3 are caught by the gradients 11a and guided onto the chassis or the guide rails 11. When the vehicle has been driven fully under the frame it is stopped and the pressure is relieved on the cylinder means 6 so as to lift the chassis 1 and cause the hooks 5 to engage the frame and lock this against any movement relative to the chassis. If necessary the hooks will also cause a final movement of the frame relative to the chassis. For further locking of the frame relative to the chassis, the chassis may be provided with locking pegs adapted to enter corresponding holes in the front end of the frame.

I claim:

1. A convertible transport vehicle with a load carrying chassis and a rear wheel-axle set coupled thereto by a spring adapted to be selectively used for the transport of goods of different kinds, the goods to be transported being disposed on loading means being fixedly mounted on a frame, said frame including means detachably securable on the chassis of the vehicle, means on the chassis for lowering and lifting it relative to the rear wheel axle of the vehicle, wherein the means lowering the chassis includes a hydraulic piston-cylinder having a linkage acting on a fixed point on the chassis and on the rear wheel axle to cause compression of the spring of the rear wheels, in which the piston-cylinder means also includes a locking arm coupled with said axle and piston to move into locking position by decompression of said spring to lock the frame to the chassis when the latter is in the non-lowered state.

2. A vehicle as defined in claim 1, including extendable support legs affixed to said frame for supporting it upon removal from said chassis.

References Cited

UNITED STATES PATENTS

| | | | |
|---|---|---|---|
| 2,780,876 | 2/1957 | Inman | 280—43.18 X |
| 2,925,930 | 2/1960 | Parks | 214—515 |
| 3,332,661 | 7/1967 | Hand | 214—515 X |

FOREIGN PATENTS

| | | |
|---|---|---|
| 71,254 | 7/1950 | Denmark. |
| 1,192,083 | 10/1959 | France. |

BENJAMIN HERSH, Primary Examiner

R. R. SONG, Assistant Examiner

U.S. Cl. X.R.

214—515